US008600138B2

(12) United States Patent
Gorges et al.

(10) Patent No.: US 8,600,138 B2
(45) Date of Patent: Dec. 3, 2013

(54) METHOD FOR PROCESSING RADIOLOGICAL IMAGES TO DETERMINE A 3D POSITION OF A NEEDLE

(75) Inventors: Sébastien Gorges, Versailles (FR); Yves Trousset, Palaiseau (FR)

(73) Assignee: General Electric Company, Schenectady, NY (US)

( * ) Notice: Subject to any disclaimer, the term of this patent is extended or adjusted under 35 U.S.C. 154(b) by 336 days.

(21) Appl. No.: 13/112,163

(22) Filed: May 20, 2011

(65) Prior Publication Data

US 2011/0286653 A1 Nov. 24, 2011

(30) Foreign Application Priority Data

May 21, 2010 (FR) ...................................... 10 53955

(51) Int. Cl.
*G06K 9/00* (2006.01)
(52) U.S. Cl.
USPC ......................................................... 382/131
(58) Field of Classification Search
USPC .......... 382/128, 131, 132; 250/363.04; 378/4, 378/21; 600/411, 424, 425, 427; 128/922
See application file for complete search history.

(56) References Cited

U.S. PATENT DOCUMENTS

| 6,149,592 | A | 11/2000 | Yanof et al. | |
|---|---|---|---|---|
| 6,947,786 | B2 * | 9/2005 | Simon et al. | 600/427 |
| 7,171,255 | B2 * | 1/2007 | Holupka et al. | 600/427 |
| 7,729,746 | B2 * | 6/2010 | Redel et al. | 600/428 |
| 7,844,320 | B2 * | 11/2010 | Shahidi | 600/424 |
| 7,996,064 | B2 * | 8/2011 | Simon et al. | 600/427 |
| 8,346,344 | B2 * | 1/2013 | Pfister et al. | 600/424 |
| 2004/0077942 | A1 * | 4/2004 | Hall et al. | 600/428 |
| 2008/0186311 | A1 | 8/2008 | Claus | |
| 2009/0069672 | A1 * | 3/2009 | Pfister et al. | 600/424 |
| 2009/0080737 | A1 * | 3/2009 | Battle et al. | 382/131 |
| 2009/0118609 | A1 * | 5/2009 | Rahn | 600/411 |

(Continued)

FOREIGN PATENT DOCUMENTS

FR 2927794 A1 8/2009
JP 2009291342 A 12/2009

(Continued)

OTHER PUBLICATIONS

Unofficial translation of Search Report and Written Opinion from FR Application No. 1053955, dated Jan. 19, 2011.

(Continued)

*Primary Examiner* — Shervin Nakhjavan
(74) *Attorney, Agent, or Firm* — Global Patent Operation

(57) ABSTRACT

A method to process images for interventional imaging, wherein a 3D image of an object is visualized with a medical imaging system, the medical imaging system comprising an X-ray source and a detector, is provided. The method comprises acquiring a plurality of 2D-projected images of the object along a plurality of orientations of the imaging chain, wherein a rectilinear instrument has been inserted into the object. The method also comprises determining a 3D reconstruction of the instrument such that a plurality of 2D projections of the 3D image of the instrument, along the respective orientations in the 2D-projected images of the object were acquired, are closest to the acquired 2D-projected images of the object. The method further comprises superimposing the 3D reconstruction of the instrument over the 3D image of the object so as to obtain a 3D image comprising the object and the instrument.

6 Claims, 3 Drawing Sheets

(56) References Cited

U.S. PATENT DOCUMENTS

| | | | |
|---|---|---|---|
| 2009/0216114 A1 | 8/2009 | Gorges et al. | |
| 2009/0257551 A1* | 10/2009 | Dafni et al. | 378/6 |
| 2009/0279767 A1* | 11/2009 | Kukuk et al. | 382/132 |
| 2009/0281418 A1* | 11/2009 | Ruijters et al. | 600/424 |
| 2010/0080354 A1 | 4/2010 | Fu et al. | |
| 2010/0152570 A1* | 6/2010 | Navab | 600/411 |
| 2010/0161023 A1* | 6/2010 | Cohen et al. | 623/1.11 |
| 2011/0037761 A1* | 2/2011 | Mistretta et al. | 345/419 |

FOREIGN PATENT DOCUMENTS

| | | |
|---|---|---|
| WO | 2008120136 A1 | 10/2008 |
| WO | 2009045827 A2 | 4/2009 |
| WO | 2009112998 A1 | 9/2009 |
| WO | 2009156918 A1 | 12/2009 |

OTHER PUBLICATIONS

Ruijters, D.S.A., "Multi-modal image fusion during minimally invasive treatment", Feb. 15, 2010, Eindhoven University of Technology, pp. 65-74, 91-97, 113-120.

Gorges, Sebastien, et al. Model of a vascular C-arm for 3D augmented fluoroscopy in interventional radiology, Med Image Computing and Computer-Assisted Intervention, vol. Part II, 2005 pp. 214-222.

Bismuth, Vincent, et al. "A comparison of line enhancement techniques: applications to guide-wire detection and respiratory motion tracking", Proc. SPIE 7259, Medical Imaging 2009: Image Processing, 72591M, Mar. 27, 2009.

* cited by examiner

METHOD FOR PROCESSING RADIOLOGICAL IMAGES TO DETERMINE A 3D POSITION OF A NEEDLE

CROSS-REFERENCE TO RELATED APPLICATIONS

This application claims priority under 35 U.S.C. §119(a) to prior-filed, co-pending French patent application serial number 1053955, filed on May 22, 2010, the disclosure of which is hereby incorporated by reference in its entirety.

BACKGROUND OF THE INVENTION

1. Field of the Invention

Embodiments of the present invention relate to the field of medical imaging and more particularly relate to the processing of interventional radiology images. Embodiment of the present invention further particularly relate to a method and system for allowing the real-time display of the position of a rectilinear instrument, notably a needle, in a region of interest of a patient.

2. Description of the Prior Art

During a surgical operation, a surgeon must insert a needle in a region of interest of a patient, for example, into the patient's spine. To control the insertion of the needle, the surgeon must be able to visualize the region of interest and the instrument used. To do so, the surgeon has a three-dimensional (3D) image of the region of interest in which the needle can be seen.

The 3D image may be obtained by tomographic reconstruction. The 3D image of the region of interest is obtained by acquiring several two-dimensional (2D) images using an X-ray medical imaging system and by determining a 3D image from the acquired 2D images. Monitoring must be ensured in real-time, which means that it is necessary to obtain 3D images of the region of interest in real-time.

One problem is that the determining of a 3D image takes time. In addition, for images obtained by tomography, determining of the 3D image requires the acquisition of numerous 2D images resulting in a non-negligible X-ray dose.

SUMMARY OF THE INVENTION

In one embodiment a method to process images for interventional imaging, wherein a 3D image of an object is visualized with a medical imaging system, the medical imaging system comprising an X-ray source and a detector, is provided. The method comprises acquiring a plurality of 2D-projected images of the object along a plurality of orientations of the imaging chain, wherein a rectilinear instrument has been inserted into the object. The method also comprises determining a 3D reconstruction of the instrument such that a plurality of 2D projections of the 3D image of the instrument, along the respective orientations in the 2D-projected images of the object were acquired, are closest to the acquired 2D-projected images of the object. The method further comprises superimposing the 3D reconstruction of the instrument over the 3D image of the object so as to obtain a 3D image comprising the object and the instrument.

In another embodiment, a medical imaging system is provided. The medical imaging system comprises a source configured to emit a beam of rays; a detector positioned facing the source and configured to detect the rays emitted by the source; a support positioned between the source and the detector; and a storage unit; an interface unit. The medical imaging system further comprises a processing unit configured to: aquire a plurality of 2D-projected images of the object along a plurality of orientations of the imaging chain, wherein a rectilinear instrument has been inserted into the object; determine a 3D reconstruction of the instrument such that a plurality of 2D projections of the 3D image of the instrument, along the respective orientations in the 2D-projected images of the object were acquired, are closest to the acquired 2D-projected images of the object; and superimpose the 3D reconstruction of the instrument over the 3D image of the object so as to obtain a 3D image comprising the object and the instrument.

BRIEF DESCRIPTION OF THE DRAWINGS

Other characteristics and advantages will become further apparent from the following description which is solely illustrative and non-limiting and is to be read with reference to the appended drawings in which.

DETAILED DESCRIPTION OF THE INVENTION

Figure 1:
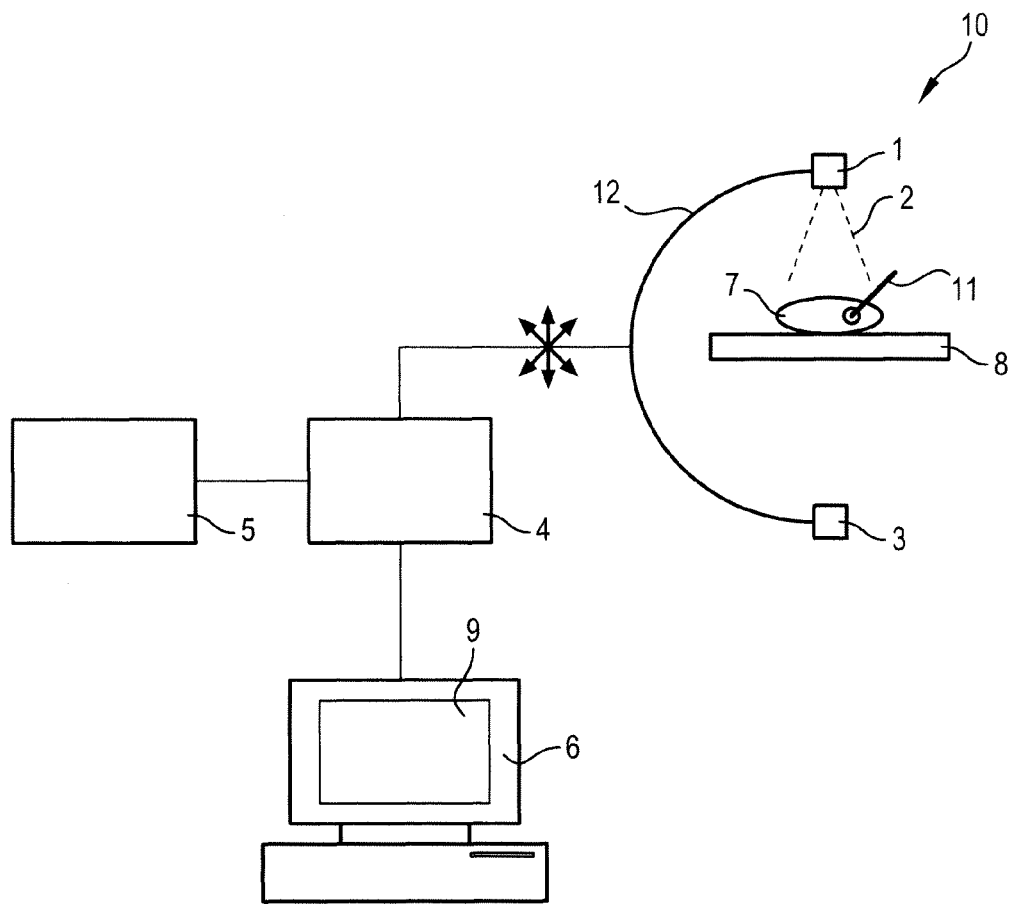
FIG. 1 illustrates a medical imaging system in accordance with one embodiment of the invention.

FIG. 1 illustrates a medical imaging system in accordance with one embodiment of the invention. In FIG. 1, the medical imaging system comprises a source 1 intended to emit a beam 2 of X-rays, a detector 3 arranged facing the source 1 and configured to detect the rays emitted by the source 1, a support 8 arranged between the source 1 and the detector 3, a processing unit 4, a storage unit 5 and an interface unit 6.

The X-ray source 1 and the detector 3 are connected via a C-arm 12. The arm 12 is more commonly called a vascular C-arm. The arm 12 can be orientated over three degrees of freedom as is illustrated by the arrows in FIG. 1.

It is the processing unit 4 which controls the position of the arm 12 i.e. the position of the X-ray source 1 in relation to the detector 3.

The support 8 is intended to receive a patient 7 in whom the surgeon is to perform surgery, such as vertebroplasty.

The processing unit 4 is configured to command emission of X-rays by the source 1 and movement of the vascular C-arm 12. In addition, the processing unit 4 is configured to command reading of an image by the detector 3 and to receive data acquired by the detector 3.

The processing unit 4 for example is one or more computers, one or more processors, one or more microcontrollers, one or more micro-computers, one or more programmable logic controllers, one or more application-specific integrated circuits, other programmable circuits, or other devices which include a computer such as a work station.

The processing unit 4 is coupled with the storage means 5 which may be integrated in or separate from the processing unit 4. These means can be formed of a hard disk or any other removable storage means (CD-ROM, disk, etc. . . . ). These storage means 5 can be used to store an acquired or processed radiological image of the region to be treated. They may be a ROM/RAM memory of the processing unit 4, a CD-ROM, USB key, memory of a central server. The processing unit 4 may comprise a reading device (not shown) e.g. a disk drive or CD-ROM drive, to read the instructions of a method to process radiological images (described below) from an instruction medium (not shown) such as a floppy disk or CD-ROM. As a variant, the processing unit 4 executes the instructions of the processing method (described below) stored in firmware (not shown).

The interface unit 6 comprises a display device 9. The interface unit 6 provides the surgeon with means to control the procedure. More precisely, during procedure, the surgeon is able to visualize a 3D image of the region of interest with the instrument on the display device 9. The display device 9 is for example a computer screen, a monitor, flat screen, plasma screen or any commercially available display device. The display device 9 enables the surgeon to visualize the instrument in the region of interest to be treated.

Figure 2:
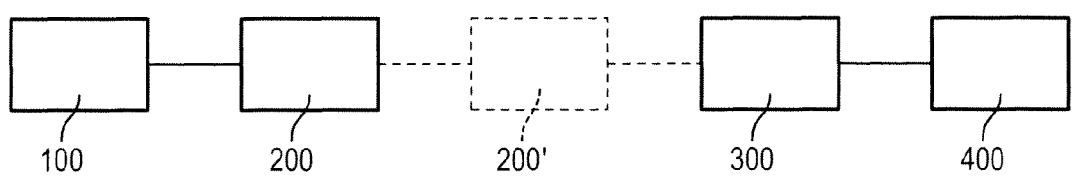
FIG. 2 schematically illustrates the steps of a method in accordance with one embodiment of the invention.

FIG. 2 schematically illustrates the steps of a method in accordance with one embodiment of the invention.

At an initializing step 100, a 3D image 20 is reconstructed of a region of interest of a patient 7 in whom surgery, and notably needle insertion, is to be performed.

Figure 3:
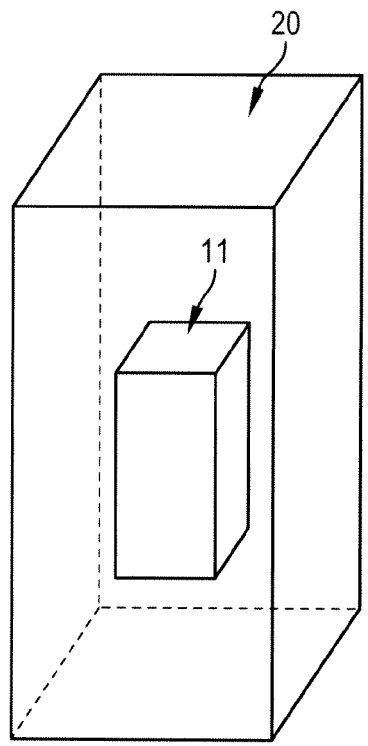
FIG. 3 illustrates a 3D image of a region of interest of an object.

FIG. 3 schematically illustrates the 3D image 20 of the region of interest of the patient 7.

This reconstruction is carried out by acquiring a succession of 2D-projected images of the region of interest of the patient 7, then by tomographic reconstruction of the 3D image from the 2D-projected images of the region of interest of the patient 7. The 3D image may be, for example, an image of a patient's spine.

When inserting the needle 11 in the patient 7, it is desired by the surgeon to track the insertion of the needle in the region of interest. Once the needle 11 has been inserted, a plurality of 2D-projected images are acquired 200. The objective of this acquisition 200 is to provide a plurality of 2D-projected images of the needle 11.

These acquired images are acquired along different orientations of the imaging chain. It is specified here that by imaging chain is meant the position of the arm 12 in space which defines a position of the X-ray source 1 in relation to the detector 3.

Figure 4A:
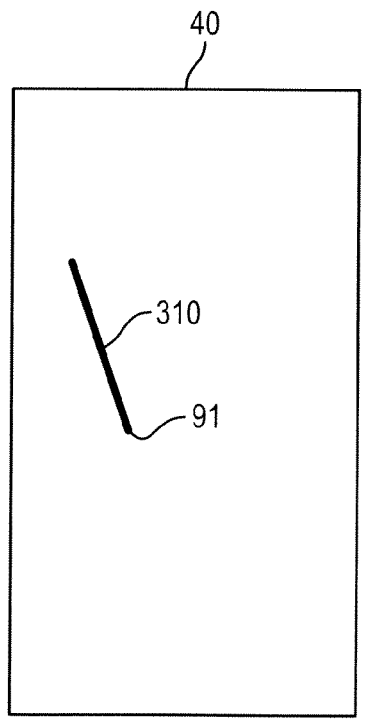
FIGS. 4a and 4b illustrate 2D-projected images of an instrument.
Figure 4B:
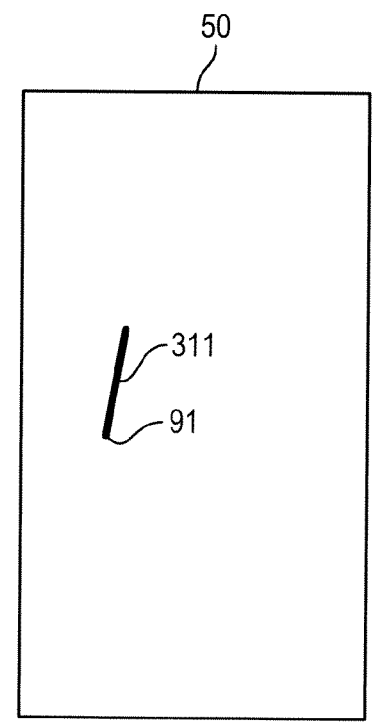

FIGS. 4a and 4b schematically illustrate two 2D-projected images 40, 50 of the needle 11. For example, between two and ten 2D-projected images may be acquired. Preferably two images are acquired. In the remainder hereof it is considered that only two 2D images 40, 50 are acquired.

These acquired 2D-projected images allow visualization of the instrument and can be filtered 200' so that the instrument is visible against the remainder of the image. Filtering consists of increasing the value of the pixels representing the needle.

Once these 2D-projected images 40, 50 have been acquired, the 3D position of the instrument is determined 300.

The 3D position of the instrument is such that a plurality of 2D projections of the 3D image of the instrument 9, along the respective orientations in which the 2D-projected images of the region of interest of the patient 7 were acquired, are closest to the 2D-projected images of the region of interest of the patient 7. In other words, a 3D reconstruction of the instrument to be tested is generated, the test consisting of projecting this 3D image along identical orientations to the orientations in which the 2D-projected images of the region of interest were acquired.

Figure 5:
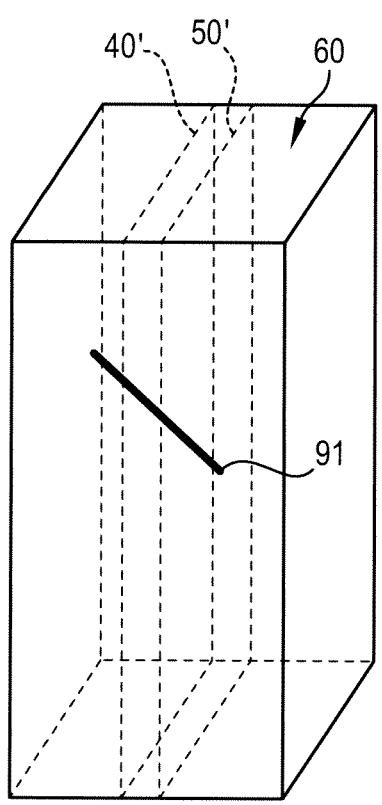
FIG. 5 illustrates a 3D image of a region of interest of an object with an instrument, according to a first configuration.

FIG. 5 illustrates the 3D image of the instrument. To determine the conformity of this 3D image of the instrument, a comparison is made between the projections 40', 50' of this 3D image 60 of the instrument with the effectively acquired 2D projections 40, 50 of the instrument.

Once this comparison is made and gives satisfaction i.e. the 2D projections 40', 50' of the instrument are close or in a best case scenario identical, the 3D reconstruction which generated these 2D projections 40', 50' of the needle is the desired 3D reconstruction of the instrument.

The 3D reconstruction 60 of the instrument thus obtained is then superimposed 400 over the 3D image of the region of interest so as to obtain a 3D image of the region of interest with the needle.

Figure 6:
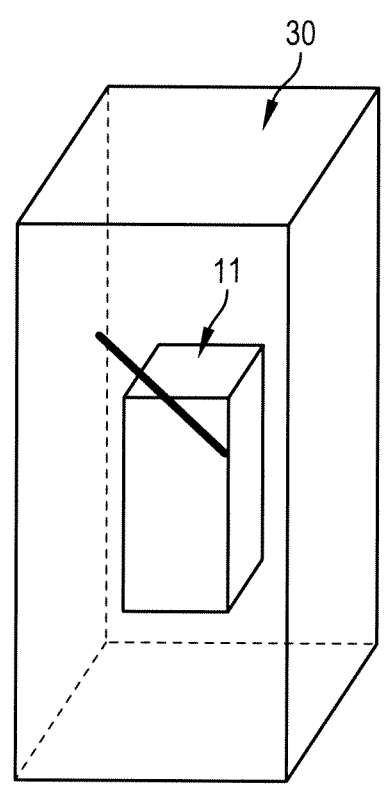
FIG. 6 illustrates a 3D image of a region of interest of an object with an instrument according to a second configuration.

FIG. 6 illustrates the 3D image of the region of interest with the needle 11.

Therefore throughout surgical procedure, to obtain a 3D image of the region of interest of the patient with the instrument, only the acquisition of 2D-projected images is required.

A detailed description is given below of the determination of the 3D image of the instrument.

As previously mentioned, two 2D-projected images 40, 50 are provided, and it is these images that are used to determine the 3D reconstruction image of the instrument. From the 2D-projected images of the instrument it is possible to determine the 3D position of the tip 91 of the needle 11.

The complete position of the needle in the 3D image is then obtained by minimizing the following criterion:

$$N = \mathrm{argmin}(S) \text{ with } S = f(S1(N1), S2(N1))$$

wherein N1 and N2 are respectively the 2D projections obtained from the 3D reconstruction of the instrument; S1 and S2 are 2D criteria for example the sum of the grey shades of the 2D images in a region of interest defined by N1 and N2; and N is the complete 3D position of the needle.

The complete 3D position of the needle is described by five parameters: the 3D position of the tip of the needle; the orientation of the needle (i.e. two angles).

It is to be noted that to obtain the complete position N of the needle it is possible to omit the step to estimate the 3D position of the tip of the needle. In this case, five unknowns are to be determined to generate the 3D image of the needle otherwise two unknowns are to be determined Once the above criterion has been minimized, the complete 3D position of the needle is obtained. It is this 3D reconstruction of the instrument which is superimposed over the 3D image of the region of interest of the patient.

What is claimed is:

1. A method to process images for interventional imaging, wherein a 3D image of an object of interest is visualized with a medical imaging system, the medical imaging system comprising an X-ray source and a detector, the method comprising:

acquiring a plurality of 2D-projected images of the object along a plurality of orientations of the imaging chain to have a plurality of 2D-projected images of a rectilinear instrument, wherein the rectilinear instrument has been inserted into the object;

determining a 3D reconstruction of the instrument by determining the complete 3D position from the 3D position of the tip of the instrument and by the orientation of the instrument, the 3D reconstruction such that a plurality of 2D projections of the 3D image of the instrument, along the respective orientations in the 2D-projected image of the object were acquired, are closest to the acquired 2D-projected images of the object; and superimposing the 3D reconstruction of the instrument over the 3D image of the object so as to obtain a 3D image comprising the object and the instrument.

2. The method according to claim 1, wherein the 3D position of the tip of the instrument is determined from the acquired 2D-projected images of the object of interest.

3. The method according to claim 1, wherein determining the complete 3D position of the instrument comprises minimizing the following criterion:

$$N=\operatorname{argmin}(S) \text{ with } S=f(S1(N1), S2(N2), Si(Ni)),$$

wherein N is the complete 3D position of the instrument;
Si is a 2D criterion for the image of index I; and
Ni is the projection of the position of the instrument in one of the 2D-projected images,
wherein I varies from 1 to M, and wherein M is the number of acquired projection images.

4. The method according to claim 1, wherein the 2D images of the region of interest are filtered so as to highlight the instrument against the remainder of the image.

5. The method according to claim 1, wherein the instrument is a needle, preferably a rigid needle whose 3D position is rectilinear.

6. A medical imaging system comprising:
a source configured to emit a beam of rays;
a detector positioned facing the source and configured to detect the rays emitted by the source;
a support positioned between the source and the detector;
a storage unit;
an interface unit; and
a processing unit configured to:
  acquire a plurality of 2D-projected images of the object along a plurality of orientation of the imaging chain to have a plurality of 2D-projected images of a rectilinear instrument, wherein the rectilinear instrument has been inserted into the object;
  determine a 3D reconstruction of the instrument by determining the complete 3D position from the 3D position of the tip of the instrument and by the orientation of the instrument, the 3D reconstruction such that a plurality of 2D projections of the 3D image of the instrument, along the respective orientations in the 2D-projected image of the object were acquired, are closest to the acquired 2D-projected images of the object; and
  superimpose the 3D reconstruction of the instrument over the 3D image of the object so as to obtain a 3D image comprising the object and the instrument.

* * * * *

UNITED STATES PATENT AND TRADEMARK OFFICE
CERTIFICATE OF CORRECTION

| | | |
|---|---|---|
| PATENT NO. | : 8,600,138 B2 | Page 1 of 1 |
| APPLICATION NO. | : 13/112163 | |
| DATED | : December 3, 2013 | |
| INVENTOR(S) | : Gorges et al. | |

It is certified that error appears in the above-identified patent and that said Letters Patent is hereby corrected as shown below:

In the Specification

In Column 4, Line 41, delete "determined" and insert -- determined. --, therefor.

In the Claims

In Column 5, Line 7, in Claim 3, delete "S2(N2), Si(Ni))," and insert -- S2(N2),…, Si(Ni)), --, therefor.

Signed and Sealed this
Eighth Day of April, 2014

Michelle K. Lee
*Deputy Director of the United States Patent and Trademark Office*